Oct. 14, 1941.  B. EICHWALD  2,258,750

TERMINAL BLOCK

Filed Dec. 12, 1940

Inventor
B. EICHWALD,
Attorney

Patented Oct. 14, 1941

2,258,750

UNITED STATES PATENT OFFICE 2,258,750

TERMINAL BLOCK

Benjamin Eichwald, New York, N. Y.

Application December 12, 1940, Serial No. 369,874

6 Claims. (Cl. 173—324)

This invention relates to electrical terminal blocks, and an object of the same is to provide an electrical terminal which permits connections to be made easily and quickly any desired number of times with the same terminal, which is secure and protected at all times against corresion or oxidation due to exposure to the atmosphere or other extraneous matter.

Another object is to provide an electrical terminal of the soldering type which permits of the making and breaking of the connection over and over again without losing the soldering material, the latter remaining housed and protected in the terminal.

The foregoing and other objects and advantages will become apparent in view of the following description taken in conjunction with the drawing, wherein.

Figure 4:
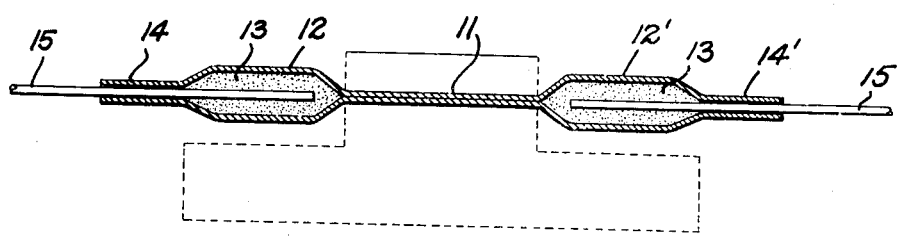
Fig. 4 is a longitudinal section through one of said terminals.

The improved terminal block comprises one or more terminals or connectors generally indicated at 10. These terminals may each be of identical construction consisting of an elongated tubular shell of tinned copper or the like. The central or intermediate portion of the connector is preferably flattened, as indicated at 11, and at each end of this flattened portion the tube is permitted to remain in its normal shape providing reservoirs 12 and 12'. These reservoirs are adapted to contain lead or other suitable soldering material or its equivalent 13, and to retain the soldering material in the reservoir, the opposite ends of the terminal or connector are pinched or partially flattened as indicated at 14 and 14' yet remain open sufficiently to permit the insertion of one or more electrical wires 15, note particularly Fig. 4.

Figure 1:
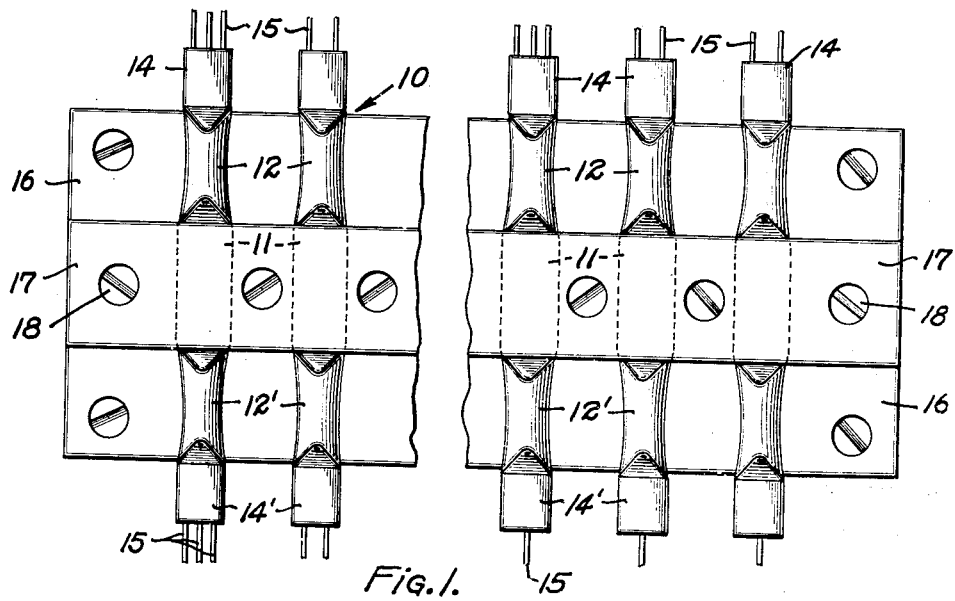
Fig. 1 is a plan view of a terminal block illustrative of the invention.
Figures 2, 3:
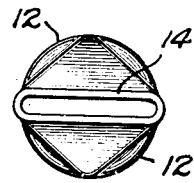
Fig. 2 is an end view of Fig. 1.
Fig. 3 is an end view of one of the terminals or connectors.

Figs. 1 and 2 illustrate how the connectors or terminals 10 may be mounted in a terminal block 16, the latter having a clamping strip 17 thereon which engages over the flattened portion 11 of each terminal and is secured in place by screws 18.

To make an efficient connection between wires, it is only necessary to hold a hot iron or other suitable heating member or unit to the reservoirs 14 or 14' until the soldering material softens sufficiently to permit the insertion of a wire into the end of the terminal. Whenever it is desired to remove the wire, the solder is again heated or softened by the application of heat.

The ends of the wires need not be twisted or otherwise distorted, the connecting operation is simple, easy and quick, and the soldering material in the reservoirs remains there permanently and never need be replaced throughout the life of the terminal, and during this time it is protected against oxidation and contamination and is therefore always clean for an efficient connection.

It will be clear that the flattened portion 11 seals the central part of the tube against entry of the solder when molten, and also provides a relatively large gripping area enabling the clamping strip 17 to secure the tube immovably to terminal block 16 when screws 18 are tightened. The pinched or partially flattened portions 14, 14' have their smallest interior dimensions barely sufficient to admit the wires or conductors 15, the result being that, as clearly shown in Fig. 4, the wires or conductors have direct metallic contact with the inner flattened walls of the tube end portions 14, 14'; and as these flattened end portions are of material length, the electrical conductivity of the connection is considerably increased, especially as the tube is preferably of copper, one of the best known conductors. However, the openings left in the flattened end portions 14, 14' are so narrow that the molten solder will freeze before it can escape from the open ends of the tube: thus the reservoirs 12, 12' are in effect sealed at each end.

It will be understood that no attempt is made herein to enumerate all the advantageous features of the improved terminal, and that certain minor changes in construction and design may be adopted without departing from the spirit or scope of the invention as defined by the appended claims.

I claim:

1. A terminal block comprising, in combination, a main supporting member having thereon a plurality of electrical terminals each comprising an elongated tube of flexible sheet material of good conductivity having the intermediate portion thereof flattened, a clamping strip overlying the flattened portions of the several tubes and secured to said supporting member holding the terminals in definite spaced relation thereon, soldering material in each tube on each side of said flattened portion, each tube beyond said soldering material being reduced in diameter to form in conjunction with said flattened portion, reservoirs for the soldering material, the opposite ends of each tube having openings of sufficient size to permit the insertion of electrical conduction wires into the soldering material in said reservoirs.

2. A terminal block comprising, in combination, a supporting member having thereon a plurality of terminals each comprising an elongated tube of good conductivity having the intermediate portion thereof flattened, means securing the tubes in spaced relation on said supporting member, each tube on each side of said flattened portion having soldering material therein, the opposite ends of the tube being pinched together sufficiently to retain the soldering material in the tube and in conjunction with said flattened portion to form reservoirs for the solder, but leaving openings in each end of the tube of sufficient size to permit the insertion of one or more electrical conductors.

3. An electrical terminal comprising an elongated tubular body having the intermediate portion thereof flattened, the tube on either side of said flattened portion having soldering material therein, the opposite ends of the tube beyond said soldering material being pinched to leave a restricted opening in each end of sufficient size to permit the insertion of conductors but sufficiently small to prevent outward flow of the soldering material when fused.

4. An electrical terminal comprising a tubular body of deformable material having high heat and electrical conducting characteristics, a mass of readily fusible material within the body in direct contact with the interior walls thereof, said fusible material being of good electrical conductivity; the outside of said body being free of all coatings and coverings so that when heat is applied thereto from the outside, the walls of the body will quickly and efficiently conduct heat to the interior of the body thereby to fuse the fusible material; said body having a flattened portion of material length at each end, said flattened portions being open at the ends sufficiently to permit the insertion of electrical conductors far enough into the body to make good electrical contact with said fusible material.

5. An electrical terminal comprising an elongated shell of deformable material having its opposite ends flattened leaving a reservoir between said ends, fusible conducting material in said reservoir, said flattened ends being open sufficiently to permit the insertion of electrical conductors into the fusible material upon heating of the latter.

6. An electrical terminal comprising an elongated tube of deformable conducting material adapted to receive electrical conductors in the opposite ends thereof, fusible conducting material disposed in the tube, said tube having its opposite end and intermediate portions flattened maintaining the fusible material within the tube in separate spaced bodies, the flattened end portions being open sufficiently to permit insertion of electrical conductors into the fusible material upon heating of the latter.

BENJAMIN EICHWALD.